No. 611,556. Patented Sept. 27, 1898.
E. A. BLANTON, Jr.
FILLING PIECE FOR CAMS.
(Application filed Jan. 17, 1898.)
(No Model.)
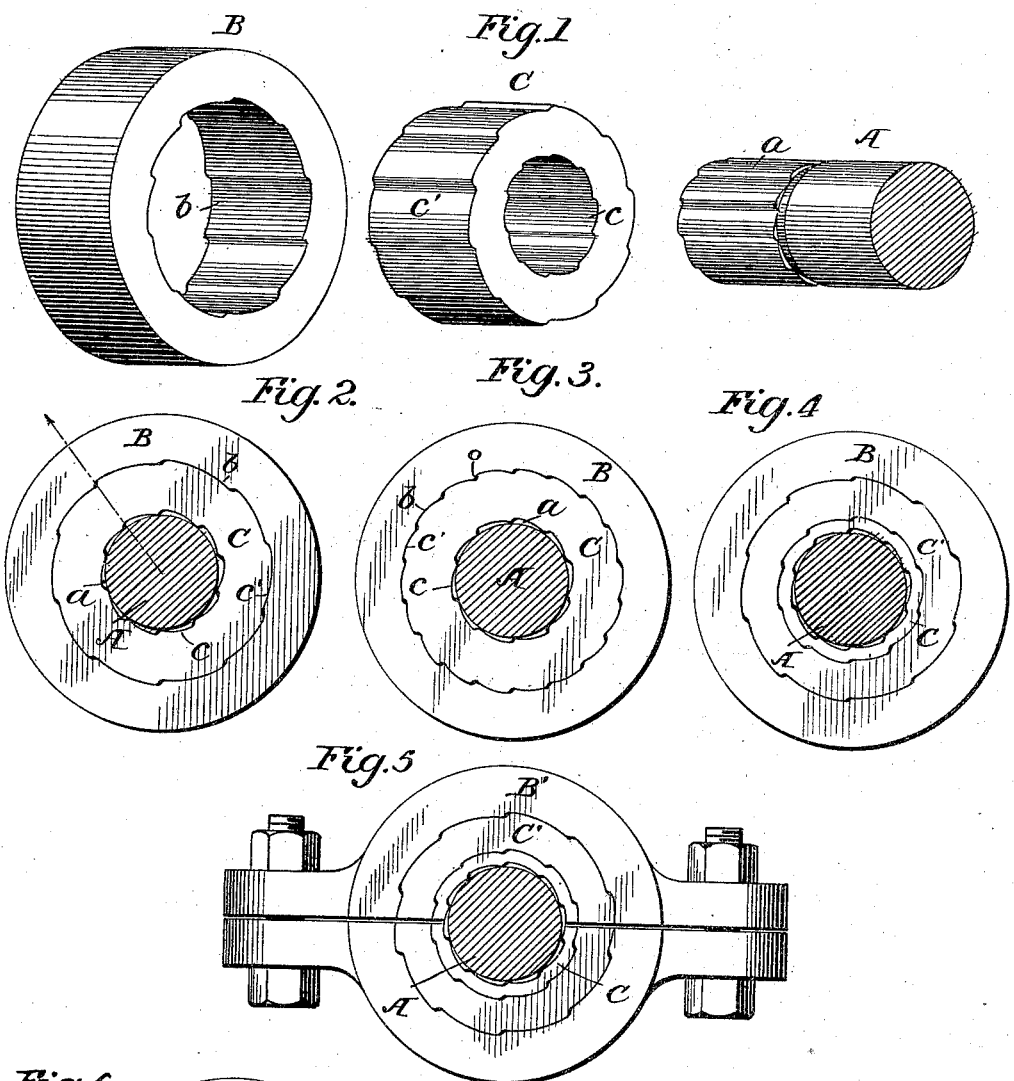

UNITED STATES PATENT OFFICE.

EDWARD ANDERSON BLANTON, JR., OF RIDLEY PARK, PENNSYLVANIA.

FILLING-PIECE FOR CAMS.

SPECIFICATION forming part of Letters Patent No. 611,556, dated September 27, 1898.

Application filed January 17, 1898. Serial No. 666,935. (No model.)

*To all whom it may concern:*

Be it known that I, EDWARD ANDERSON BLANTON, Jr., a citizen of the United States, residing at Ridley Park, in the county of Delaware and State of Pennsylvania, have invented certain new and useful Improvements in Filling-Pieces for Cams, of which the following is a specification.

My invention relates to means for securing hubs, sleeves, and similar devices upon shafts, and has for its object to provide what may be termed "filling-pieces" adapted to be interposed between the hub, sleeve, or similar device and the shaft and to aid in connecting the two together; and to these ends my invention consists in the various features of construction and arrangement of parts, substantially as hereinafter more particularly set forth.

In the accompanying drawings, Figure 1 is a perspective view showing the shaft, filling-piece, and hub or sleeve separate. Figs. 2 to 5, inclusive, are end views showing different embodiments of my invention. Fig. 6 is an end view showing the bosses or wedge-shaped portions occupying less than the circumference of the shaft.

In my prior patent, No. 581,476, granted April 27, 1897, I have shown, described, and claimed a means for securing cams or hubs upon shafts in which, among other things, the shaft was provided with a series of curved wedge-shaped bosses arranged in a circumferential line around the shaft, and the hub was provided with a similar series of recesses and was adapted to be tightened upon the shaft by turning on said bosses, and in my Patent No. 601,232, granted March 29, 1898, I have shown, described, and claimed an extension of this invention whereby the general principles thereof are adapted to a coupling for shafts and similar devices, and my present invention may be said to be a further improvement and extension of the broad principles of construction involved in said patents.

I have found that in many instances it is desirable to provide a shaft or supporting-piece of a standard size and to have the hubs of varying sizes, according to the purposes for which they are intended, and to provide filling-pieces adapted to be interposed between the hub and the shaft, so that various-sized hubs may be applied to a single shaft. It has also been found desirable, for other reasons, to provide filling-pieces which may be used in other connections which need not be recited, and in the present case I will describe in detail the construction and arrangement of the filling piece or pieces adapted to be interposed between a shaft and a hub or sleeve, which will serve as an illustration of the general principles of my invention, so as to enable those skilled in the art to make and use it for the various purposes for which it is applicable.

Referring to Fig. 1, for instance, A is a shaft or rod or piece of material serving as a support for a sleeve B, which hub may be the hub of a propeller, a cam, a pulley, or any other mechanical device, or simply a sleeve, as illustrated in the drawings, as I have not deemed it necessary to show any of the forms of devices which may be attached to the hub or sleeve, and C represents a filling-piece adapted to be interposed between the hub or sleeve and the shaft or rod and to serve to secure the two together. In this instance I have shown the filling-piece C of a length substantially equal to the length of the hub or sleeve, although, of course, the relations of the parts, as far as length is concerned, are immaterial.

The shaft A is provided with one or more wedge-shaped portions *a*, which, as shown in the present instance, are of a length substantially equal to the length of the filling-piece, although, of course, they may be of any desired length. I have shown a series of wedge-shaped portions arranged circumferentially around the shaft, there being ten in the present instance, and while I consider this a desirable number any other number may be used, and while I prefer that the wedge-shaped portions or bosses shall practically cover the entire circumference of the shaft it is evident that the object of my invention can be accomplished by having one or more bosses which extend only partially around the circumference, leaving a plane surface of greater or less extent, although when there is a plurality of bosses it is manifestly preferable that they be symmetrically arranged around the circumference, so that the filling-pieces can be readily applied in different positions. The outer surfaces of the wedge-shaped portions or bosses $a$ are preferably on curves having gradually-increasing radii, measured from the center of the shaft, either in the form of true eccentrics or involute curves or otherwise.

The filling-piece C is provided with bosses or wedges $c\ c'$ on its outer and inner bearing or engaging surfaces. The bosses $c$ on its inner surfaces correspond in contour to the bosses or wedges $a$ on the shaft. The surfaces of the bosses $c$, however, are preferably a little longer than the outer surfaces of the bosses $a$, so as to leave a slight space, as represented by the heavy portions $o$ of the line, between the thickened portion of the bosses when the filling-piece is in position, allowing a loose fit between the shaft and filling-piece when first applied and permitting a tight fit by rotating the parts in relation to each other.

The exterior of the filling-piece C is also provided with bosses or wedge-shaped portions $c'$, they being shown in Fig. 1 as extending around the periphery of the filling-piece circumferentially and occupying substantially the whole of the surface, although they may be of any number and occupy a greater or less portion of the periphery or surface of the filling-piece. The sleeve B is provided with complementary bosses $b$, corresponding in number to the bosses or wedge-shaped portions $c'$ on the filling-piece.

The parts are assembled in a manner well understood by those familiar with my prior invention, the filling-piece being slipped over the shaft and the hub or sleeve being slipped over the filling-piece, when by turning the shaft and filling-piece with relation to the hub or sleeve they are all securely locked in position with relation to each other, and the pulley or other device connected with the hub or sleeve B is caused to rotate or move in harmony with the movements of the shaft or rod A.

In Fig. 2 I have shown an end view of the shaft, filling-piece, and hub or sleeve in which the shaft A has a certain number of bosses or wedge-shaped portions $a$, and the filling-piece C has a like number of bosses or wedge-shaped portions $c'$, there being, of course, a like number of complementary bosses $c\ d$ on the interior surfaces of the filling-piece and hub or sleeve. It will be seen that in this arrangement the bosses $c'$ on the filling-piece C have longer bearing-surfaces than the bosses $a$ on the shaft A, and they are preferably arranged so that their highest portions are in lines radiating from the axis of the shaft. In Fig. 3 a similar arrangement is shown, except that the number of bosses $c'$ on the filling-piece C differs from the number of bosses $a$ on the shaft, there being a greater number in this instance, and the bearing-surfaces of the bosses $c'$ are shown as being substantially the same in length as the bearing-surfaces of the bosses $a$, and, of course, the complementary bosses, both on the filling-piece and hub or sleeve, must correspond therewith.

In Fig. 4 I have shown two filling-pieces C and C', and each of these in this instance has the same number of bosses or wedge-shaped portions as the shaft, although it is evident that the number may vary.

In Fig. 5 I have illustrated an application of my invention wherein the filling-pieces C C' are made in two sections and the hub or sleeve B' is also made in sections united by any suitable means, and it is evident that the filling piece or pieces and the hub or sleeve may be in any number of sections.

In Fig. 6 I have shown the shaft as provided with three bosses or wedge-shaped portions $a$, they being separated the one from the other with intervening circumferential spaces, and the filling-piece is provided with a number of complementary bosses $c$, arranged to conform thereto, and the outer surface of the filling-piece is provided with a different number of bosses or wedge-shaped portions, and the hub or sleeve, of course, is provided with a number of complementary bosses arranged to correspond therewith.

While, as above stated, the outer surfaces of the bosses are preferably on curves having a gradually-increasing radii, measured from the center of the shaft, it is not absolutely necessary that this should be so, as the outer surfaces may more or less approximate a right line and still some of the advantages of my invention be attained, although in practice I have found that the curved surfaces above described produce the best results.

These various modifications or embodiments of my invention are typical and serve to show some of the ways in which my invention may be applied and will indicate to those skilled in the art the scope of the invention and show that it may be used in many and various ways and adapted to the circumstances of any particular construction without departing from the general principles of the invention.

The filling-pieces may be made in any desired way, as by turning, or they may be stamped or formed out of wrought-iron or otherwise, and if desired to have a uniform size of shaft adapted to be used in connection with various-sized hubs or sleeves a series of filling-pieces of various thicknesses may be provided which can be used in securing any-sized hub or sleeve to the standard-shaft. Vice versa, if the hubs or sleeves are standardized by the use of various-sized filling-pieces different-sized shafts can be connected thereto. It is evident that the filling-pieces may be used as couplings joining the ends of two shafts, and many other uses of the filling-pieces will be apparent to those skilled in the art which need not be recited herein— as, for instance, on the same shaft there may be hubs or sleeves fitting directly on the shaft and other hubs or sleeves provided with filling-pieces interposed between them and the shaft.

From the above description, taken in connection with the drawings, it will be manifest that the invention is adapted for many purposes and can be applied in many ways and furnishes a satisfactory means of connecting many mechanical devices having what may be termed a "hub" or "sleeve" to a driving or driven shaft, rod, or support, and, as set forth in my prior patent, by turning the hub or sleeve with relation to the shaft or support it is securely self-tightened thereon and self-centered, but can be readily loosened when for any purpose this is desirable.

What I claim is—

1. A filling-piece adapted to be interposed between a shaft and sleeve said filling-piece having self-tightening bosses on its engaging surfaces, substantially as described.

2. A filling-piece adapted to be interposed between a shaft and sleeve said filling-piece having self-tightening bosses on its engaging surfaces, the number of bosses on its inner and outer engaging surfaces corresponding, substantially as described.

3. A filling-piece adapted to be interposed between a shaft and sleeve said filling-piece comprising sections having self-tightening bosses on their engaging surfaces, substantially as described.

4. The combination with a shaft and sleeve, of a series of filling-pieces adapted to be interposed between the shaft and sleeve, the filling-pieces having self-tightening bosses on their engaging surfaces, substantially as described.

5. The combination with a shaft and sleeve having bosses, of a filling-piece adapted to be interposed between the shaft and sleeve and having bosses on its engaging surfaces, the shaft, sleeve and filling-piece being tightened by turning, substantially as described.

In testimony whereof I have signed my name to this specification in the presence of two subscribing witnesses.

EDWARD ANDERSON BLANTON, JR.

Witnesses:
ROBERT L. MORGAN,
L. M. BLANTON.